United States Patent
Tucci et al.

(10) Patent No.: US 12,257,897 B2
(45) Date of Patent: Mar. 25, 2025

(54) VEHICLE ACCESS SYSTEM AND METHODS FOR PROVIDING ZONE-DETERMINATION BASED FEATURES THEREWITH

(71) Applicant: Robert Bosch GmbH, Stuttgart (DE)

(72) Inventors: Michael Tucci, Westland, MI (US); Christopher Cundiff, Macomb, MI (US); Paul Edward Tunnecliffe, Templestowe (AU); Julien Fritz, Novi, MI (US); David Coleman, Livonia, MI (US); Aimee Williams, Troy, MI (US); Christopher Prediger, Novi, MI (US); Srikanth Basa, Farmington Hills, MI (US); Jack Murfett, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 588 days.

(21) Appl. No.: 16/891,389

(22) Filed: Jun. 3, 2020

(65) Prior Publication Data

US 2021/0379990 A1    Dec. 9, 2021

(51) Int. Cl.
| | | |
|---|---|---|
| *B60R 16/037* | (2006.01) | |
| *B60K 28/06* | (2006.01) | |
| *B60R 25/20* | (2013.01) | |
| *B60R 25/24* | (2013.01) | |
| *B60W 50/12* | (2012.01) | |
| *H04M 1/72454* | (2021.01) | |
| *H04M 1/72463* | (2021.01) | |
| *B60W 40/08* | (2012.01) | |

(52) U.S. Cl.
CPC .......... *B60K 28/063* (2013.01); *B60R 16/037* (2013.01); *B60R 25/2081* (2013.01); *B60R 25/245* (2013.01); *B60W 50/12* (2013.01); *H04M 1/72454* (2021.01); *H04M 1/72463* (2021.01); *B60W 2040/0836* (2013.01)

(58) Field of Classification Search
CPC . B60K 28/063; B60R 16/037; B60R 25/2081; B60R 25/245; B60R 25/31; B60W 50/12; B60W 2040/0836; H04M 1/72454; H04M 1/72463; H04W 4/021; H04W 4/12; H04W 4/40
USPC ........................................................ 180/272
See application file for complete search history.

(56) References Cited

U.S. PATENT DOCUMENTS

| | | | |
|---|---|---|---|
| 7,934,577 | B2 | 5/2011 | Walter et al. |
| 8,145,199 | B2 | 3/2012 | Tadayon et al. |
| 8,258,968 | B2 | 9/2012 | Ghazarian et al. |

(Continued)

FOREIGN PATENT DOCUMENTS

| | | |
|---|---|---|
| CN | 102573058 A | 7/2012 |
| CN | 104833946 A | 8/2015 |

(Continued)

*Primary Examiner* — Richard A Goldman
(74) *Attorney, Agent, or Firm* — Maginot, Moore & Beck LLP

(57) ABSTRACT

A vehicle access system is disclosed having the plurality of system nodes for localizing a target portable device. In addition to Passive Entry/Passive Start (PEPS) features, the vehicle access system is configured to provide a variety of additional intelligent features depending on which zone of the vehicle the target portable device is located, depending on an identity of the person carrying the target portable device, and depending on other parameters or conditions.

18 Claims, 5 Drawing Sheets

(56) References Cited

U.S. PATENT DOCUMENTS

| | | | |
|---|---|---|---|
| 8,768,539 B1* | 7/2014 | Clement | B60W 50/08 701/2 |
| 9,272,713 B1* | 3/2016 | Dvoskin | B60W 40/08 |
| 9,584,518 B1* | 2/2017 | Robertson | H04L 65/1104 |
| 9,686,397 B1* | 6/2017 | Hu | H04B 11/00 |
| 9,852,560 B2 | 12/2017 | Bauman et al. | |
| 10,435,027 B2 | 10/2019 | Bahn | |
| 11,351,941 B1* | 6/2022 | Maney, Jr. | B60R 16/037 |
| 2010/0234047 A1* | 9/2010 | Lipovski | H04M 19/044 455/466 |
| 2012/0214463 A1* | 8/2012 | Smith | H04W 4/50 455/26.1 |
| 2014/0210239 A1* | 7/2014 | Yetukuri | B60N 2/0228 297/217.1 |
| 2014/0309806 A1* | 10/2014 | Ricci | G06F 21/31 701/1 |
| 2014/0310739 A1* | 10/2014 | Ricci | G06F 16/183 725/75 |
| 2015/0019266 A1* | 1/2015 | Stempora | G06Q 40/08 705/4 |
| 2015/0120151 A1* | 4/2015 | Akay | G07C 9/28 701/1 |
| 2017/0052538 A1* | 2/2017 | Li | H04W 4/48 |
| 2017/0096145 A1* | 4/2017 | Bahn | B60Q 9/00 |
| 2017/0131261 A1* | 5/2017 | Biondo | A61B 5/4845 |
| 2017/0303090 A1* | 10/2017 | Stitt | H04W 12/06 |
| 2017/0365106 A1* | 12/2017 | Lei | A61B 5/0013 |
| 2018/0268628 A1 | 9/2018 | Jain et al. | |
| 2018/0288232 A1* | 10/2018 | MacNeille | H04M 11/007 |
| 2019/0025402 A1* | 1/2019 | Qu | G01S 11/14 |
| 2019/0054852 A1* | 2/2019 | Wickramasinghe | B60Q 1/247 |
| 2019/0106024 A1* | 4/2019 | Wellborn | B60N 2/0224 |
| 2019/0124619 A1* | 4/2019 | Arumugam | G06Q 50/40 |
| 2019/0135229 A1 | 5/2019 | Ledvina et al. | |
| 2019/0230213 A1 | 7/2019 | Konchan et al. | |
| 2019/0300006 A1* | 10/2019 | Golsch | G07C 9/00309 |
| 2021/0107380 A1* | 4/2021 | Jo | B60N 2/002 |
| 2021/0199793 A1* | 7/2021 | Adler | G01S 13/762 |
| 2021/0284089 A1* | 9/2021 | Yamaguchi | H04W 12/03 |
| 2022/0108228 A1* | 4/2022 | Salter | H04W 12/63 |
| 2023/0077123 A1* | 3/2023 | Salter | E05B 81/20 |
| 2023/0182746 A1* | 6/2023 | Brillon | G01S 13/765 |
| 2023/0278469 A1* | 9/2023 | Jones | B60N 2/0268 296/65.12 |
| 2023/0334921 A1* | 10/2023 | Cheikh | G07C 9/00309 |

FOREIGN PATENT DOCUMENTS

| | | |
|---|---|---|
| CN | 107600113 A | 1/2018 |
| CN | 108688594 A | 10/2018 |
| CN | 108700419 A1 | 10/2018 |
| CN | 109844822 A | 6/2019 |
| CN | 110612554 A | 12/2019 |
| JP | 2001-130351 A | 5/2001 |
| JP | 2007216920 A * | 8/2007 |
| JP | 2009-214591 A | 9/2009 |
| JP | 2010273155 A * | 12/2010 |
| JP | 2012196998 A * | 10/2012 |
| JP | 2013-175927 A | 9/2013 |
| JP | 2016-120865 * | 7/2016 |
| JP | 2016120865 A * | 7/2016 |
| WO | 2019/189253 A1 | 10/2019 |

\* cited by examiner

VEHICLE ACCESS SYSTEM AND METHODS FOR PROVIDING ZONE-DETERMINATION BASED FEATURES THEREWITH

FIELD

The device and method disclosed in this document relates to a vehicle access system and, more particularly, to a vehicle access system that provides zone-determination based features.

BACKGROUND

Unless otherwise indicated herein, the materials described in this section are not prior art to the claims in this application and are not admitted to the prior art by inclusion in this section.

Passive Entry/Passive Start (PEPS) systems enable a user to conveniently lock and unlock a vehicle, as well as start the engine of the vehicle, without the need to physically insert or otherwise handle the key for the vehicle. Instead, the user simply carries a key FOB or smart device on his or her person and the PEPS system automatically detects that the key FOB or smart device is within a predefined range of the vehicle and enables to user to lock or unlock the vehicle. Likewise, when the user presses a pushbutton to start the engine of the vehicle, the PEPS system automatically determines whether the key FOB or smart device is located within the vehicle and, if so, enables the user to start the engine.

In general, PEPS systems utilize some mechanism for determining the location of the key FOB or smart device, relative to the vehicle. However, the determined location of the key FOB or smart device is only used enable the passive entry and passive start features. It would be advantageous to provide a vehicle access system that utilizes the determined location of the key FOB or smart device to enable additional features, in addition to passive entry and passive start features.

SUMMARY

A method of operating a vehicle access system is disclosed. The vehicle access system including a plurality of system nodes installed throughout a vehicle, each system node in the plurality of system nodes including a radio transceiver configured to wirelessly communicate with a target portable device. The method comprises determining, with a processor of the vehicle access system, a location of the target portable device with respect to the vehicle by operating the radio transceivers of the plurality of system nodes to perform a ranging process with the target portable device. The method further comprises determining, with the processor, whether the target portable device is located within a predefined zone within the vehicle based on the determined location of the target portable device. The method further comprises operating, with the processor, at least one component of the vehicle in response to the target portable device being located within the predefined zone.

A vehicle access system is disclosed. The vehicle access system comprises a plurality of system nodes installed throughout a vehicle, each system node in the plurality of system nodes including a radio transceiver configured to wirelessly communicate with a target portable device. The vehicle access system further comprise a processor operably connected to the plurality of system nodes. The processor is configured to determine a location of the target portable device with respect to the vehicle by operating the radio transceivers of the plurality of system nodes to perform a ranging process with the target portable device. The processor is further configured to determine whether the target portable device is located within a predefined zone within the vehicle based on the determined location of the target portable device. The processor is further configured to operate at least one component of the vehicle in response to the target portable device being located within the predefined zone.

BRIEF DESCRIPTION OF THE DRAWINGS

The foregoing aspects and other features of the vehicle access system are explained in the following description, taken in connection with the accompanying drawings.

DETAILED DESCRIPTION

Figure 1:
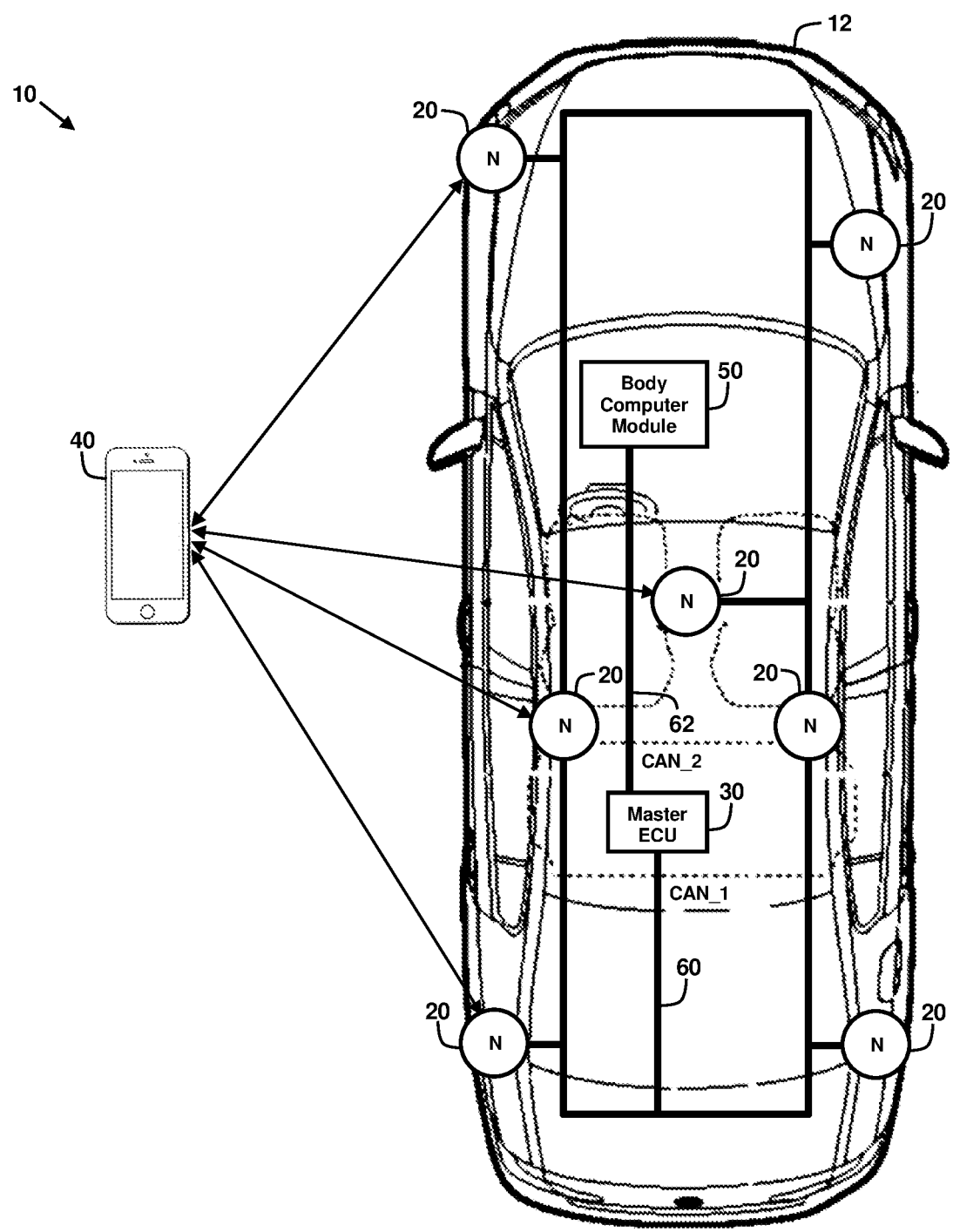
FIG. 1 shows an exemplary embodiment of a vehicle access system for a vehicle.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Vehicle Access System

With reference to FIGS. 1 and 2A-2C, an exemplary embodiment of a vehicle access system 10 for a vehicle 12 is described. As shown in FIG. 1, the vehicle access system 10 includes a plurality of system nodes 20, 30 arranged at various locations of the vehicle 12. The vehicle access system 10 is configured to localize a target portable device 40 in order to provide passive entry/passive start (PEPS) features, such as enabling unlocking of the vehicle 12 when the target portable device 40 is within a predetermined range of the vehicle 12, enabling starting of the vehicle 12 when the target portable device 40 is inside the vehicle 12, and automatically locking the vehicle 12 when the target portable device 40 is no longer within a predetermined range of the vehicle 12. Once a driver or passenger has brought the target portable device 40 into the vehicle, the vehicle access system 10 is advantageously configured to provide additional features based on where the target portable device 40 is located within the vehicle. These additional features may include a variety of vehicle personalization and safety features.

It will be appreciated that the particular number of system nodes 20, 30 and particular locations of the system nodes 20, 30 will depend on the desired accuracy and performance, as well as the particular make and model of the vehicle 12. In one embodiment, the vehicle access system 10 includes at least a minimum number of system nodes 20, 30 that are necessary required for satisfying a particular Thatcham category requirements (e.g., enabling vehicle lock/unlock within two a meter perimeter of vehicle and vehicle start when a target portable device is in the vehicle). The system nodes 20, 30 are configured to communicate with target portable device 40 and, in particular, to enable determination of a position of the target portable device 40. In at least one embodiment, ultra-wideband (UWB) communications are utilized between the system nodes 20, 30 and the target portable device 40 to enable localization of target portable device 40.

In terms of network definition, the system nodes 20, 30 include a master electronic control unit (ECU) 30 (which may also be referred to herein as the "master system node") and a plurality of slave system nodes 20. The master ECU 30 is connected to each of the slave system nodes 20 via a first communication bus 60, preferably in the form of a controller area network (CAN) bus (CAN_1). The master ECU 30 communicates with the slave system nodes 20, via the first communication bus 60, to operate the slave system nodes 20 and to collect ranging data from the slave system nodes 20 for the purpose of localizing the target portable device 40. In at least one embodiment, the master ECU 30 is configured to process the ranging data collected by the system nodes 20, 30 to localize the target portable device 40.

In some embodiments, the master ECU 30 is configured to pair with or otherwise communicate with the target portable device 40 using at least one additional communication technique, such as Bluetooth® or Bluetooth Low Energy® (BLE), aside from that which is used for localization of the localization of target portable device 40. Alternatively, in some embodiments, one of the slave system nodes 20 is instead configured to pair with or otherwise communicate with the target portable device 40 using at least one additional communication technique, such as Bluetooth® or BLE, aside from that which is used for localization of the localization of target portable device 40. In either case, this additional communication channel may be used for setup and configuration of the passive entry/passive start (PEPS) features of the vehicle access system 10.

In some embodiments, the master ECU 30 is further connected to a body computer module (BCM) 50 (or other vehicle computer) via a second communication bus 62, preferably in the form of a further CAN bus (CAN_2). The BCM 50 is configured to control and monitor various body electronics functions in the vehicle 12 including functions such as exterior and interior lighting, locks, pushbutton ignition, windows, wipers, air-conditioning, heating functions, and parking aids.

Figure 2A:
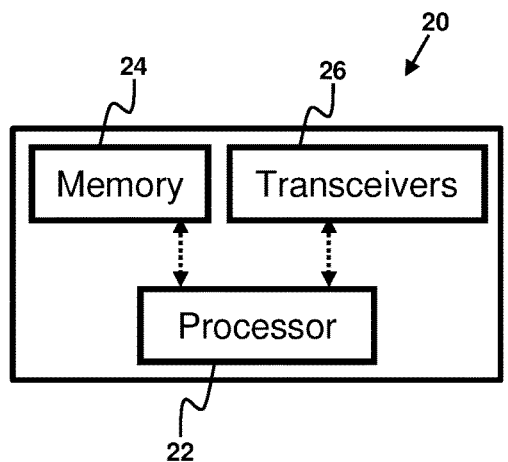
FIGS. 2A, 2B, and 2C show exemplary embodiments of a slave system node, a master ECU, and a target portable device, respectively, of the vehicle access system of FIG. 1.

FIG. 2A shows an exemplary embodiment of a slave system node 20. In the illustrated embodiment, each slave system node 20 comprises a processor 22, memory 24, and one or more radio transceiver(s) 26. The memory 24 is configured to store program instructions that, when executed by the processor 22, enable the respective slave system node 20 to perform various operations described elsewhere herein, including localization of the target portable device 40. The memory 24 may be of any type of device capable of storing information accessible by the processor 22, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor 22 may include a system with a central processing unit, graphics processing units, multiple processing units, dedicated circuitry for achieving functionality, programmable logic, or other processing systems. In one embodiment, the processor 22 includes logic and/or discreet hardware for communicating via the first communication bus 60 (e.g., a suitable CAN bus controller).

The radio transceiver(s) 26 at least include an ultra-wideband transceiver and corresponding antenna configured to communicate with the target portable device 40 and with other system nodes 20, 30, as well as any processors, memories, oscillators, or other hardware conventionally included in a UWB radio module. The radio transceiver(s) 26 may further include various other devices configured for wireless communication with other electronic devices, including the ability to send communication signals and receive communication signals. In some embodiments, the radio transceiver(s) 26 comprise multiple ultra-wideband transceivers and/or multiple ultra-wideband antennas arranged in an array. In one embodiment, the radio transceiver(s) 26 of at least one of the slave system nodes 20 further includes a Bluetooth® or Bluetooth Low Energy® (BLE) transceiver configured to communicate with the target portable device 40.

Figure 2B:
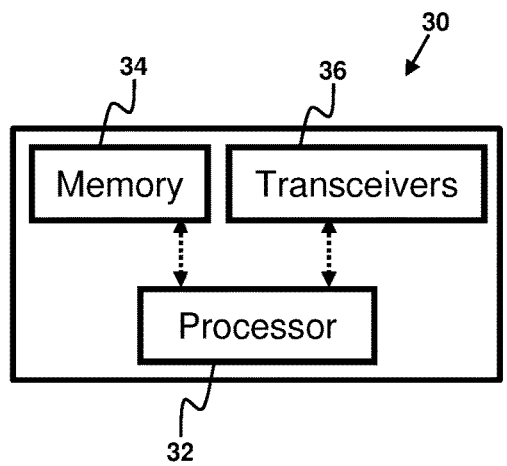

FIG. 2B shows an exemplary embodiment of a master ECU 30. In the illustrated embodiment, the master ECU 30 comprises a processor 32, memory 34, and one or more radio transceiver(s) 36. The memory 34 is configured to store program instructions that, when executed by the processor 32, enable the master ECU 30 to perform various operations described elsewhere herein, including localization of the target portable device 40. The memory 34 may be of any type of device capable of storing information accessible by the processor 32, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor 32 may include a system with a central processing unit, graphics processing units, multiple processing units, dedicated circuitry for achieving functionality, programmable logic, or other processing systems. In one embodiment, the processor 32 includes logic and/or discreet hardware for communicating via the first communication bus 60 and the second communication bus 62 (e.g., a suitable CAN bus controller).

The radio transceiver(s) 36 at least include an ultra-wideband transceiver and corresponding antenna configured to communicate with the target portable device 40 and with other system nodes 20, as well as any processors, memories, oscillators, or other hardware conventionally included in a UWB radio module. The radio transceiver(s) 36 may further include various other devices configured for wireless communication with other electronic devices, including the ability to send communication signals and receive communication signals. In some embodiments, the radio transceiver(s) 36 comprise multiple ultra-wideband transceivers and/or multiple ultra-wideband antennas arranged in an array. In one embodiment, the radio transceiver(s) 36 further include a Bluetooth® or BLE transceiver configured to communicate with the target portable device 40.

Figure 2C:
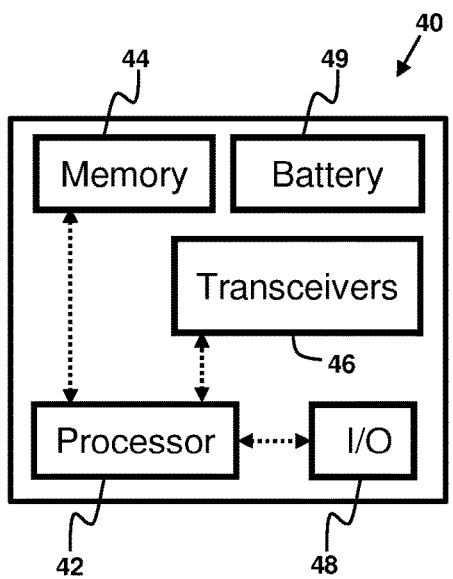

FIG. 2C shows an exemplary embodiment of a target portable device 40, which may comprise a smart phone, a smart watch, a key-fob, or the like. In the illustrated embodiment, the target portable device 40 comprises a processor 42, memory 44, radio transceivers 46, an I/O interface 48, and a battery 49. The memory 44 is configured to store program instructions that, when executed by the processor 42, enable the target portable device 40 to perform various operations described elsewhere herein, including communicating with the system nodes 20, 30 for the purpose of localizing the target portable device 40. The memory 44 may be of any type of device capable of storing information accessible by the processor 42, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor 42 may include a system with a central processing unit, graphics processing units, multiple processing units, dedicated circuitry for achieving functionality, programmable logic, or other processing systems.

The radio transceiver(s) 46 at least include an ultra-wideband transceiver and corresponding antenna configured to communicate with the system nodes 20, 30, as well as any processors, memories, oscillators, or other hardware conventionally included in a UWB radio module. The radio transceiver(s) 46 may further include various other devices configured for wireless communication with other electronic devices, including the ability to send communication signals and receive communication signals. In at least one embodiment, the radio transceivers 46 include a Bluetooth® or BLE transceiver configured to communicate with the master ECU 30 and/or certain ones of the slave system nodes 20 also having a BLE transceiver. In one embodiment, the transceivers 46 further include additional transceivers which are common to smart phones and/or smart watches, such as Wi-Fi transceivers and transceivers configured to communicate via for wireless telephony networks. The I/O interface 48 includes software and hardware configured to facilitate communications with the one or more interfaces (not shown) of the target portable device 40, such as tactile buttons, switches, and/or toggles, touch screen displays, microphones, speakers, and connection ports. The battery 49 is configured to power the various electronic devices of the target portable device 40 and may comprise a replaceable or rechargeable battery.

Ranging and Localization of the Target Portable Device

The ultra-wideband transceivers of the system nodes 20, 30 and of the target portable device 40 can be used to localize the target portable device 40. Particularly, as mentioned above, the vehicle access system 10 is configured to localize the target portable device 40 in order to provide passive entry/passive start (PEPS) features, as well as additional features described in more detail below.

Figure 3:
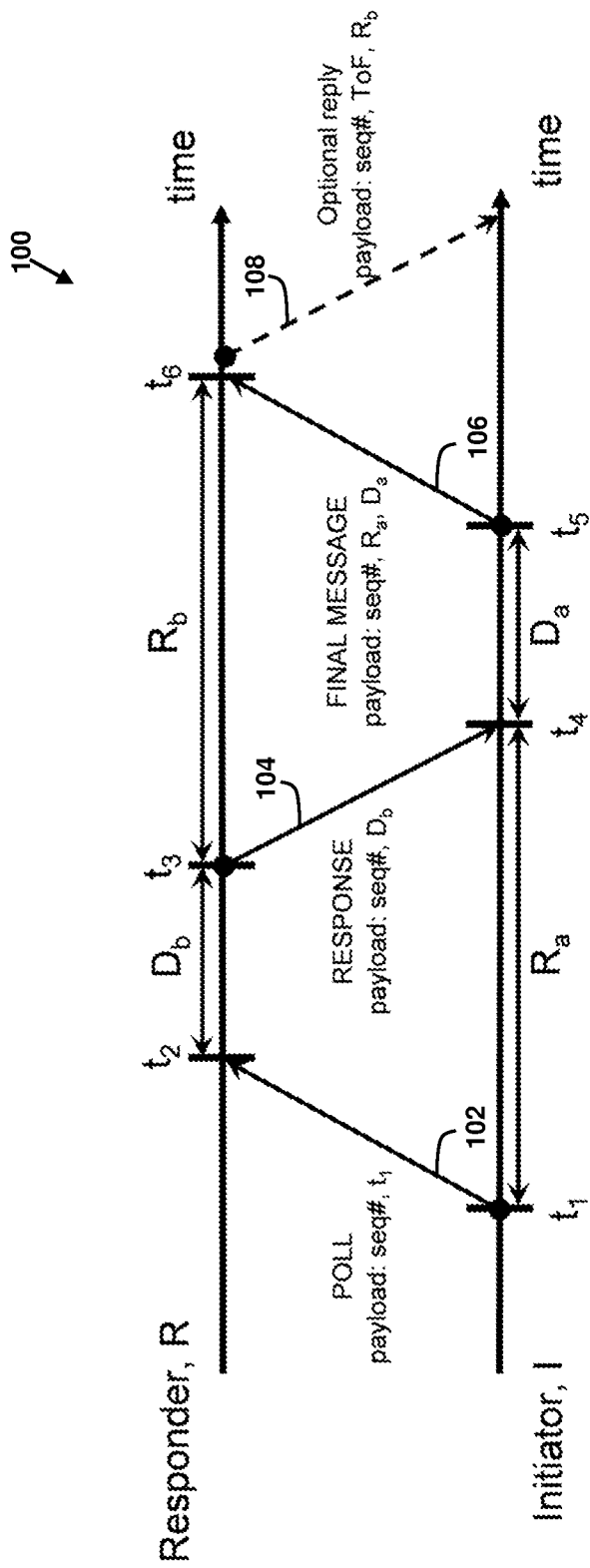
FIG. 3 illustrates one way ranging (OWR), two way ranging (TWR), and symmetric double-sided two way ranging (SDS-TWR) processes for determining a distance between two devices.

FIG. 3 illustrates a process 100 for determining a distance between two devices, an initiator I and a responder R, each of which may correspond to one of the slave system nodes 20, the master ECU 30, or the target portable device 40. Particularly, both the localization of the target portable device 40 and the localization of slave system nodes 20 having unknown installation locations involve determining distances from one device to another device. A distance from a given system node 20, 30 to the target portable device 40 or to another of the system nodes 20, 30 can be computed by measuring a time of flight for a message communicated between the devices. Time of flight (ToF) is the amount of time taken by the message to go from one device to the other. A distance between the devices is estimated based on the ToF, given that the message was travelling at speed of light. There are a few different ways to calculate the ToF, which are illustrated in FIG. 3, one way ranging (OWR), two way ranging (TWR), and symmetric double-sided two way ranging (SDS-TWR).

For one way ranging (OWR), the initiator I sends a poll message 102 with a timestamp $t_1$, at which the initiator I started transmitting. The responder R receives the poll message 102 and records a timestamp $t_2$ at which the responder R received the poll message 102. The responder R (or other device) calculates the ToF as a difference between the two timestamps $t_1$ and $t_2$ (i.e., $ToF=t_2-t_1$). A distance between the initiator I and the responder R can be calculated according to the equation $d_{I \to R}=c \times ToF$, where c is the speed of light.

We note that, for the one way ranging process to accurately estimate ToF, the clocks of both the initiator I and the responder R must be accurately synchronized. To avoid the synchronization requirement of the one way ranging process, a two way ranging (TWR) process can be used. Here, the initiator I sends the poll message 102 with a sequence number seq # and the timestamp $t_1$. The sequence number seq # is used to differentiate between successive transmissions. Particularly, when messages are not received by the responder R due to bad channel, the responder R needs to know what message it is responding to. The responder R then replies by sending a response message 104 with the sequence number seq # and an expected wait time $D_b$ between the timestamp $t_2$ at which the responder R received the poll message 102 and a timestamp $t_3$ at which the responder R sends the response message 104 (i.e., $D_b=t_3-t_2$). The initiator I receives the response message 104 and records a timestamp $t_4$ at which the initiator I received the response message 104. The initiator I calculates its overall round trip time $R_a$ as a difference between the timestamp $t_1$, at which the initiator I sent the poll message 102 and the timestamp $t_4$, at which the initiator I received the response message 104 (i.e., $R_a=t_4-t_1$). The initiator I (or other device) calculates the ToF as half the difference between the overall round trip time $R_a$ and the wait time $D_b$ (i.e., $ToF=(R_a-D_b)/2$). We note that the response message 104 can also be used to determine the ToF using the one way ranging process above (i.e., $ToF=t_4-t_3$). Thus, the two way ranging process can be thought of as performing two different one way ranging processes and determining the ToF as an average.

Finally, for an even more accurate estimation of time of flight, a symmetric double-sided two way ranging (SDS-TWR) process can be used. Particularly, this process mitigates effects of additional delays introduced into the system, such as antenna delays, clock delays, delays caused by the environment, etc. In this scheme, in addition after the two way ranging process, the initiator I sends a final message 106 to the responder R with the sequence number seq #, the round trip time $R_a$ and its own expected wait time $D_a$ between the timestamp $t_4$ at which the initiator I received the response message 104 and a timestamp $t_5$ at which the initiator I sends the final message 106 (i.e., $D_a=t_5-t_4$). The responder R receives the final message 106 and records a timestamp $t_6$ at which the responder R received the final message 106. The responder R calculates its overall round trip time $R_b$ as a difference between the timestamp $t_3$, at which it the responder R sent the response message 104 and the timestamp $t_6$, at which the responder R received the final message 106 (i.e., $R_b=t_6-t_3$). The responder R (or other device) calculates the ToF according to the equation ToF=

$(R_a R_b - D_a D_b)/(R_a + R_b + D_a + D_b)$, or equivalent. We note that the response message 104 and final message 106 can also be used to determine the ToF using the two way ranging process above (i.e., $\text{ToF} = (R_b - D_a)/2$). Thus, the symmetric double-sided two way ranging process can be thought of as performing two different two way ranging processes and determining the ToF as an average. In some embodiments, the responder R can also send an optional reply message 108 to the initiator I with the sequence number seq #, the calculated ToF, and the round trip time $R_b$.

During localization of the target portable device 40, the target portable device 40 can be either one of the initiator I or the responder R. Once distances have been measured between the target portable device 40 and several system nodes 20, 30 having known positions, the location of the target portable device 40 can be calculated by trilateration according to a set of spherical equations in the form of $(x_I - x_R)^2 + (y_I - y_R)^2 + (z_I - z_R)^2 = d_{I \to R}^2$, where in each case $(x_I, y_I, z_I)$ is the position of the respective initiator I or $(x_R, y_R, z_R)$ is the position of the respective responder R. However, without additional information, distances to the target device from a minimum of four system nodes 20, 30 having known locations are generally required for 3D localization. Likewise, without additional information, distances to the target portable device 40 from a minimum of three system nodes 20, 30 having known locations are generally required for 2D localization.

In an alternative embodiment, the target portable device 40 can be localized by multilateration based on a time difference of arrival (TDoA) of a message from a target portable device 40 by several system nodes 20, 30 having known locations. Particularly, in this embodiment, the target portable device 40 broadcasts a blink message. A plurality of the system nodes 20, 30 receive the blink message and each record a respective timestamp at which the respective system node 20, 30 received the blink message. Since each system 20, 30 is arranged at a different location within the vehicle, the blink message is received by the system nodes 20, 30 at different times depending on their respective distance from the target portable device 40. Distances between the target portable device 40 and each of the system nodes 20, 30 that received the blink message, as well as the location of the target portable device 40 can be calculated according to a set of hyperboloid equations.

It will be appreciated that additional methods for ranging between devices and for localizing the target portable device 40 may also be used. However, in any case, the position of each system node 20, 30 within the vehicle 12 must be determined before the vehicle access system 10 can successfully localize the target portable device 40 for the purpose of providing passive entry/passive start (PEPS) features.

Method of Operating the Vehicle Access System

As discussed above, once a driver or passenger has brought the target portable device 40 into the vehicle, the vehicle access system 10 is advantageously configured to provide additional features based on where the target portable device 40 is located within the vehicle. These additional features may include a variety of vehicle personalization and safety features.

Figure 4:
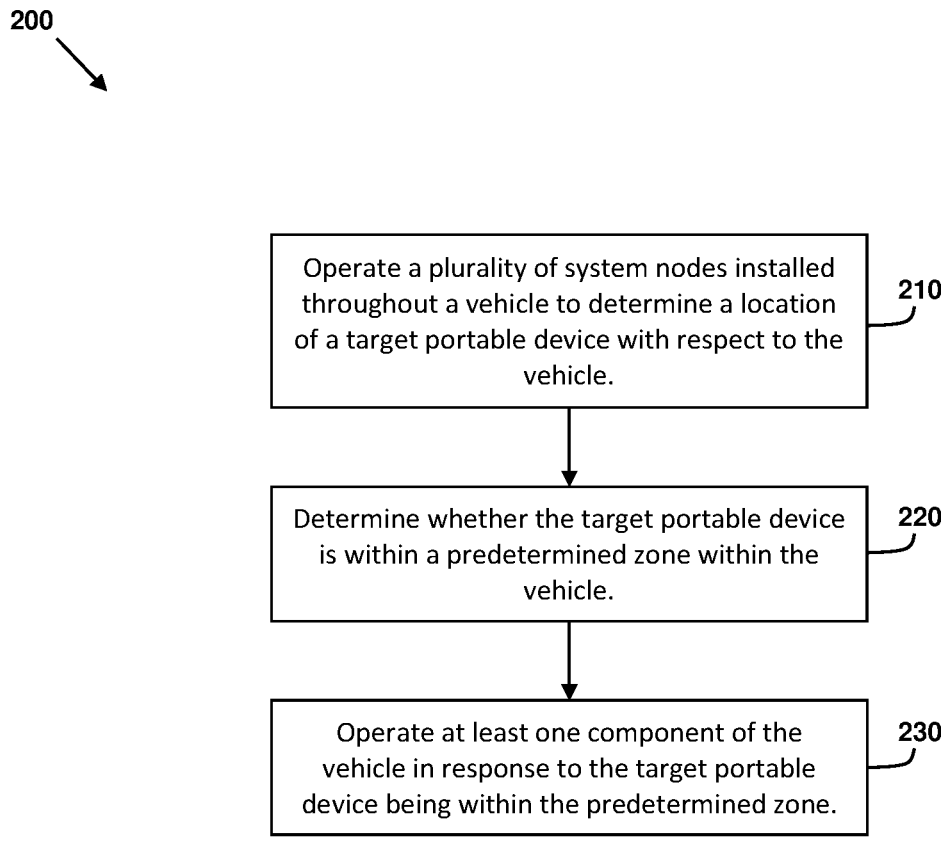
FIG. 4 shows a logical flow diagram for a method of operating a vehicle access system to provide zone-determination based features.

FIG. 4 shows a logical flow diagram for a method 200 of operating a vehicle access system to provide zone-determination based features. In the description of the method, statements that a method, process, processor, and/or system is performing some task or function refers to a controller or processor (e.g., the processor 22 of a slave system node or the processor 32 of the master ECU 30) executing programmed instructions stored in non-transitory computer readable storage media (e.g., the memory 24 of a slave system node or the memory 34 of the master ECU 30) operatively connected to the controller or processor to manipulate data or to operate one or more components in the vehicle access system 10 to perform the task or function. Additionally, the steps of the methods may be performed in any feasible chronological order, regardless of the order shown in the figures or the order in which the steps are described.

The method 200 begins with a step of operating a plurality of system nodes installed throughout a vehicle to determine a location of a target portable device with respect to the vehicle (block 210). Particularly, the processor 32 of the master ECU 30 operates the system nodes 20, 30 to perform a ranging process with respect to the target portable device 40, for example using one of the ranging processes described above with respect to FIG. 3. The processor 32 of the master ECU 30 receives ranging data or measurements from the slave system nodes 20 and calculates the position of the target portable device 40, as described above with respect to FIG. 3. The calculated position of the target portable device 40 is, for example, in the form of rectangular 3D coordinates (x, y, z) a reference coordinate system of the vehicle or, alternatively, in the form of rectangular 2D coordinates (x, y) in a reference coordinate system of the vehicle (in which height is omitted or ignored). In one embodiment, the processor 32 of the master ECU 30 transmits a message, such as a CAN message, to the BCM 50 (or other vehicle computer) via the communication bus 62 that indicates the current position of the target portable device 40.

Based on the current position of the target portable device 40, the processor of the BCM 50 (or other vehicle computer) operates vehicle locks and vehicle ignition in order to provide passive entry/passive start (PEPS) features. Particularly, in one embodiment, the processor of the BCM 50 unlocks or enables unlocking of the vehicle 12 in response to the target portable device 40 being within a predetermined range of the vehicle 12. In one embodiment, the processor of the BCM 50 starts or enables starting of the vehicle 12 when the target portable device 40 is inside the vehicle 12. In one embodiment, the processor of the BCM 50 automatically locks the vehicle 12 when the target portable device 40 is no longer within a predetermined range of the vehicle 12. In some alternative embodiments, the processor 32 of the master ECU 30 may operate vehicle locks and vehicle ignition directly, rather than the BCM 50 doing so.

The method 200 continues with a step of determining whether the target portable device is within a predetermined zone within the vehicle (block 220). Particularly, the processor 32 of the master ECU 30 is configured to determine whether the target portable device 40 is within a predetermined zone within the vehicle 12 based on the calculated position of the target portable device 40. In some embodiments, the predetermined zone is defined by a set of boundaries in the reference coordinate system of the vehicle. The set of boundaries may, for example, be in the form of minimum and maximum values for each axis of the reference coordinate system, $x_{min}$, $x_{max}$, $y_{min}$, $y_{max}$, $x_{min}$, and $z_{max}$, so as to define a rectangular volume of space within the vehicle 12. It should be appreciated, of course, that more complex non-rectangular zones can also be defined. The processor 32 of the master ECU 30 determines whether the target portable device 40 is within the predetermined zone of within the vehicle 12 by comparing the calculated position of the target portable device 40, e.g. (x, y, z), with the set of boundaries, e.g., $x_{min}$, $x_{max}$, $y_{min}$, $y_{max}$, $x_{min}$, and $z_{max}$. In one embodiment, the processor 32 of the master ECU 30 transmits a message, such as a CAN message, to the BCM 50 (or other vehicle computer) via the communication bus 62 that indicates the current zone in which the target portable device 40 is located.

Figure 5:
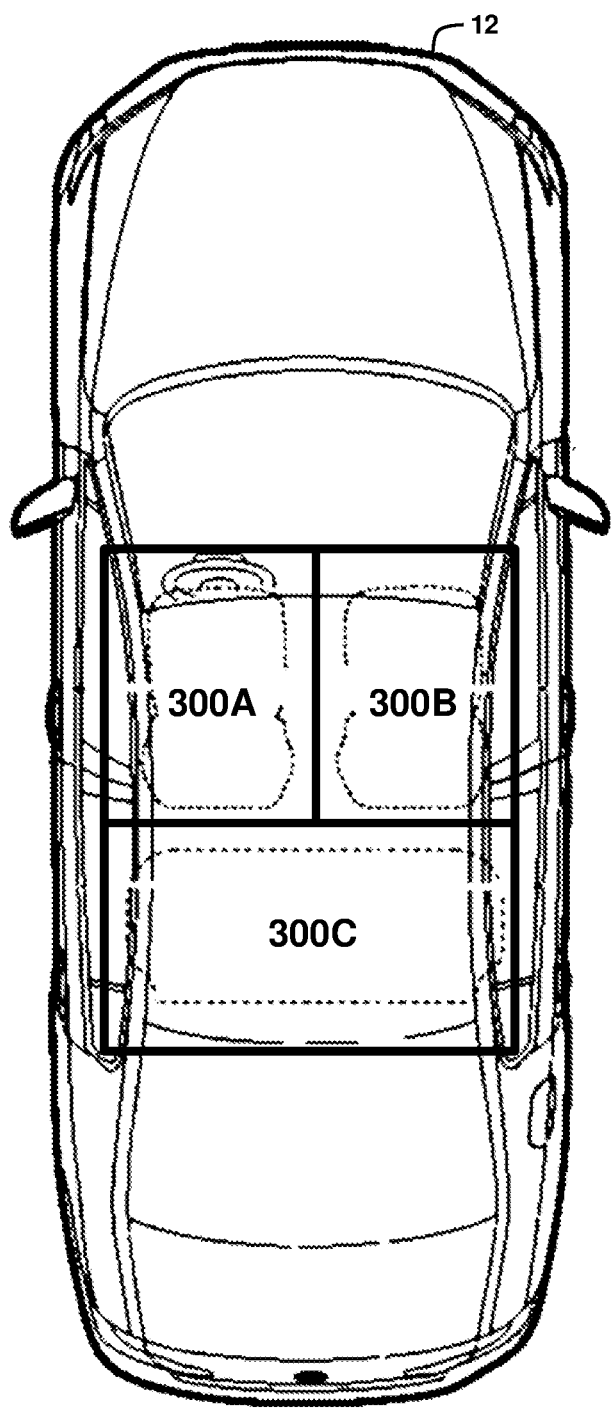
FIG. 5 shows an exemplary set of zones within the vehicle of FIG. 1.

In at least some embodiments, a plurality of zones within the vehicle 12 are defined. Accordingly, the processor 32 of the master ECU 30 determines, for each zone, whether the target portable device 40 is within the respective zone. FIG. 5 shows an exemplary set of zones 300A-C within the vehicle 12. A driver seat zone 300A is defined in a region of the vehicle corresponding to the driver seat of vehicle 12. A front passenger seat zone 300B is defined in a region of the vehicle corresponding to the front passenger seat of vehicle 12. A back passenger seat zone 300C is defined in a region of the vehicle corresponding to the back passenger seats of vehicle 12. It should be appreciated that the zones can be defined in any manner corresponding to individual seats, to groups of seats, or to regions of the vehicle that do not include seats.

The method 200 continues with operating at least one component of the vehicle in response to the target portable device being within the predetermined zone. (block 230). Particularly, the processor 32 of the master ECU 30 is configured to operate at least one component of the vehicle 12 in response to the target portable device being within a particular zone 300A-C within the vehicle 12. In some embodiments, the processor 32 of the master ECU 30 operates a component directly by transmitting a command message, such as a CAN message, directly to the component via the communication bus 62. Alternatively, the processor 32 of the master ECU 30 operates a component indirectly by transmitting a command message, such as a CAN message, to the BCM 50 (or other vehicle computer) via the communication bus 62. In response to the command message, the BCM 50 (or other vehicle computer) operates the component in the commanded manner. Finally, in some embodiments, the processor 32 of the master ECU 30 simply transmits a message, such as a CAN message, to the BCM 50 (or other vehicle computer) via the communication bus 62 that indicates the current zone in which the target portable device 40 is located. In response, the BCM 50 (or other vehicle computer) operates the component in the appropriate manner, based on the zone in which the target portable device 40 is located. Accordingly, statements herein that the processor 32 of the master ECU 30 operates a component, sets a parameter of a component, or performs some other action with respect to a component should be read to include both direct performance or indirect performance by way of the BCM 50 (or other vehicle computer), as described above.

In one embodiment, the processor 32 of the master ECU 30 is configured to cause a text messaging service of the target portable device 40 to be disabled in response to the target portable device 40 being within the driver seat zone 300A and the vehicle traveling at a speed exceeding a predetermined threshold speed (e.g., 3 km/h). Particularly, the processor 32 of the master ECU 30 receives a travel speed of the vehicle, for example from the BCM 50 or from a speedometer directly via the communication bus 62. In response to the target portable device 40 being within the driver seat zone 300A and the travel speed of the vehicle exceeding a predetermined threshold speed (e.g., 3 km/h), the processor 32 of the master ECU 30 operates a transceiver of the vehicle 12, for example the Bluetooth® or Bluetooth Low Energy® (BLE) transceiver of the master ECU 30, to transmit a message to the target portable device 40 that causes a texting messaging service of the target portable device 40 to be temporarily disabled.

In one embodiment, the processor 32 of the master ECU 30 is configured to disable starting of the vehicle 12 in response to the target portable device 40 being within the driver seat zone 300A and a breathalyzer test result exceeding a predetermined blood alcohol content threshold. Particularly, the processor 32 of the master ECU 30 receives a message from the target portable device 40 including a breathalyzer test result, for example via the Bluetooth® or Bluetooth Low Energy® (BLE) transceiver of the master ECU 30. The breathalyzer test result may, for example, have been generated by a breathalyzer device (not shown) that is in wired or wireless communication with target portable device 40. In response to the target portable device 40 being within the driver seat zone 300A and the breathalyzer test result exceeding a predetermined blood alcohol content threshold, the processor 32 of the master ECU 30 operates an ignition system of the vehicle to temporarily disable start of the vehicle 12. In an alternative embodiment, the processor 32 of the master ECU 30 operates the ignition system of the vehicle 12 to disable start of the vehicle until a breathalyzer test result is received that does not exceed the predetermined blood alcohol content threshold.

In some embodiments, the processor 32 of the master ECU 30 is configured to operate one or more components of the vehicle 12 depending on an identity the person carrying the target portable device 40. Particularly, the processor 32 of the master ECU 30 receives a message from the target portable device 40 including an identifier of the target portable device 40, for example via the Bluetooth® or Bluetooth Low Energy® (BLE) transceiver of the master ECU 30. In response to the target portable device 40 being within a particular zone 300A-C, the processor 32 of the master ECU 30 operates one or more components of the vehicle 12 depending on the identifier of the target portable device 40.

In some embodiments, one or more user profiles are stored by a memory of the vehicle access system 10 or of the vehicle 12, for example the memory 34 of the master ECU 30. Each user profile is associated with a respective identifier and stores one or more personalization settings for one or more components of the vehicle 12. The processor 32 of the master ECU 30 matches the identifier received in the message from the target portable device 40 with a corresponding identifier of a stored user profile. In response to the target portable device 40 being within a particular zone 300A-C, the processor 32 of the master ECU 30 operates one or more components of the vehicle 12 in accordance with the personalization settings for the one or more components stored in the user profile matched to the identifier of the target portable device 40.

In one embodiment, the processor 32 of the master ECU 30 is configured to automatically set a position of a steering wheel of the vehicle 12. Particularly, in response to the target portable device 40 being within the driver seat zone 300A, the processor 32 of the ECU 30 is configured to operate an actuator of the steering wheel to set a position of the steering wheel in accordance with a predetermined position associated with the identifier of the target portable device 40. The predetermined position for the steering wheel may be stored in a corresponding user profile, as described above.

In one embodiment, the processor 32 of the master ECU 30 is configured to automatically set a position of an exterior mirror of the vehicle 12. Particularly, in response to the target portable device 40 being within the driver seat zone 300A, the processor 32 of the ECU 30 is configured to operate an actuator of the exterior mirror to set a position of the exterior mirror in accordance with a predetermined position associated with the identifier of the target portable device 40. The predetermined position for the exterior mirror may be stored in a corresponding user profile, as described above.

In one embodiment, the processor 32 of the master ECU 30 is configured to automatically set an operating mode of a transmission of the vehicle 12. Particularly, in response to the target portable device 40 being within the driver seat zone 300A, the processor 32 of the ECU 30 is configured to set an operating mode of the transmission in accordance with a predetermined operating mode associated with the identifier of the target portable device 40. The predetermined operating mode for the transmission may be stored in a corresponding user profile, as described above. The possible operating modes of the transmission may, for example, include an automatic gearing mode or a manual gearing mode, as well as an economy performance mode, a sport performance mode, or an enhanced sport performance mode.

In one embodiment, the processor 32 of the master ECU 30 is configured to automatically set an operating mode of a cruise control system of the vehicle 12. Particularly, in response to the target portable device 40 being within the driver seat zone 300A, the processor 32 of the ECU 30 is configured to set an operating mode of the cruise control system in accordance with a predetermined operating mode associated with the identifier of the target portable device 40. The predetermined operating mode for the cruise control system may be stored in a corresponding user profile, as described above. The possible operating modes of the cruise control system may, for example, include a standard cruise control mode or an adaptive cruise control mode, as well as particular settings for the adaptive cruise control mode.

In one embodiment, the processor 32 of the master ECU 30 is configured to automatically set various personalization settings of an infotainment system of the vehicle 12. Particularly, in response to the target portable device 40 being within the driver seat zone 300A, the processor 32 of the ECU 30 is configured to set various personalization settings of an infotainment system in accordance with predetermined personalization settings associated with the identifier of the target portable device 40. The predetermined personalization settings for the infotainment system may be stored in a corresponding user profile, as described above. The possible personalization settings for the infotainment system may, for example, include a favorite radio channels or favorite applications (for which shortcuts are made available), available applications, or sound level or equalizer settings.

In one embodiment, the processor 32 of the master ECU 30 is configured to automatically set various personalization settings of a passenger entertainment system of the vehicle 12, such as one installed for back seat passengers. Particularly, in response to the target portable device 40 being within a passenger seat zone 300B or 300C, the processor 32 of the ECU 30 is configured to set various personalization settings of the corresponding passenger entertainment system in accordance with predetermined personalization settings associated with the identifier of the target portable device 40. The predetermined personalization settings for the passenger entertainment system may be stored in a corresponding user profile, as described above. The possible personalization settings for the infotainment system may, for example, include a favorite radio channels or favorite applications (for which shortcuts are made available), available applications, or sound level or equalizer settings.

In one embodiment, the processor 32 of the master ECU 30 is configured to automatically set a target temperature for the vehicle 12. Particularly, in response to the target portable device 40 being within the driver seat zone 300A, the processor 32 of the ECU 30 is configured to operate a temperature control system of the vehicle 12 to set a temperature of the vehicle 12 in accordance with a predetermined target temperature associated with the identifier of the target portable device 40. The predetermined target temperature for the vehicle 12 may be stored in a corresponding user profile, as described above.

In one embodiment, the processor 32 of the master ECU 30 is configured to automatically set a lighting level within the vehicle 12. Particularly, in response to the target portable device 40 being within the driver seat zone 300A, the processor 32 of the ECU 30 is configured to operate a lighting system of the vehicle 12 to set a lighting level of the vehicle 12 in accordance with a predetermined lighting level associated with the identifier of the target portable device 40. The predetermined lighting level for the vehicle 12 may be stored in a corresponding user profile, as described above.

In one embodiment, the processor 32 of the master ECU 30 is configured to automatically set a target temperature for a particular seat in vehicle 12. Particularly, in response to the target portable device 40 being within the zone 300A-C corresponding to the particular seat, the processor 32 of the ECU 30 is configured to operate a temperature control system of the seat to set a temperature of the seat in accordance with a predetermined target temperature associated with the identifier of the target portable device 40. The predetermined target temperature for the seat may be stored in a corresponding user profile, as described above.

In one embodiment, the processor 32 of the master ECU 30 is configured to automatically set a position for a particular seat in vehicle 12. Particularly, in response to the target portable device 40 being within the zone 300A-C corresponding to the particular seat, the processor 32 of the ECU 30 is configured to operate an actuator of the seat to set a position of the seat in accordance with a predetermined position for the seat associated with the identifier of the target portable device 40. The predetermined position for the seat may be stored in a corresponding user profile, as described above.

In one embodiment, the processor 32 of the master ECU 30 is configured to automatically fold or unfold one or more foldable passenger seats of the vehicle 12 (typically a back passenger seat). Particularly, the processor 32 of the master ECU 30 is configured to operate the system nodes 20, 30 to perform a ranging process with respect to a plurality of target portable devices 40, for example using one of the ranging processes described above with respect to FIG. 3, and to determine respective locations for each of the target portable devices 40. Based on the number of target portable devices 40 that are nearby the vehicle 12 (e.g., with a predetermined distance), the processor 32 of the master ECU operates an actuator of the foldable passenger seat to fold or unfold the foldable passenger seat. For example, only two target portable devices 40 are detected nearby, the processor 32 of the master ECU 30 operates an actuator of a foldable back passenger seat to fold the seat, to provide more cargo space. Likewise, if more than two target portable devices 40 are detected nearby, the processor 32 of the master ECU 30 operates the actuator of the foldable back passenger seat to unfold the seat, to provide more seats for passengers. It should be appreciated the particular threshold numbers of target portable devices 40 that are detected nearby for folding or unfolding particular seats depend upon the number of seats and arrangement of seats in the vehicle 12.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of operating a vehicle access system of a vehicle, the vehicle access system including a plurality of system nodes installed throughout a vehicle, each system node in the plurality of system nodes including a radio transceiver configured to wirelessly communicate with a target portable device, the method comprising:
    determining, with a processor of the vehicle access system, a location of the target portable device with respect to the vehicle by operating the radio transceivers of the plurality of system nodes to perform a ranging process with the target portable device;
    determining, with the processor, whether the target portable device is located within a predefined zone within the vehicle based on the determined location of the target portable device, the predefined zone corresponding to a location of a driver seat within the vehicle;
    receiving, with the processor, a message from the target portable device including an identifier of the target portable device, the identifier being a value that identifies the target portable device; and
    setting, with the processor, an operating mode of a transmission of the vehicle in response to the target portable device being located within the predefined zone and in accordance with a predetermined operating mode for the transmission associated with the identifier of the target portable device, setting the operating mode including at least one of (i) setting a gearing mode of the transmission or (ii) setting a performance mode of the transmission.

2. The method according to claim 1, the method further comprising:
    receiving, with the processor, a message from the target portable device including a breathalyzer test result, the breathalyzer test result having been generated by a breathalyzer device that is in communication with the target portable device; and
    operating, with the processor, an ignition system of the vehicle to disable start of the vehicle in response to the target portable device being located within the predefined zone and the breathalyzer test result exceeding a predetermined blood alcohol content.

3. The method according to claim 1, further comprising:
    storing, in a memory of the vehicle access system, at least one user profile, each user profile being associated with a respective identifier and storing a personalization setting for at least one component of the vehicle;
    matching, with the processor, the identifier of the target portable device to the respective identifier of the at least one user profile; and
    operating, with the processor, the at least one component of the vehicle in response to the target portable device being located within the predefined zone and in accordance with the personalization setting for the at least one component stored in the user profile corresponding to the identifier of the target portable device.

4. The method according to claim 1, the method further comprising:
    operating, with the processor, an actuator of a steering wheel of the vehicle to set a position of the steering wheel in response to the target portable device being located within the predefined zone and in accordance with a predetermined position for the steering wheel associated with the identifier of the target portable device.

5. The method according to claim 1, the method further comprising:
    operating, with the processor, an actuator of an exterior mirror of the vehicle to set a position of the exterior mirror in response to the target portable device being located within the predefined zone and in accordance with a predetermined position for the exterior mirror associated with the identifier of the target portable device.

6. The method according to claim 1, the method further comprising:
    receiving, with the processor, a travel speed of the vehicle;
    determining, with the processor, whether the travel speed exceeds a predetermined threshold speed; and
    operating, with the processor, a transceiver of the vehicle to transmit a message to the target portable device that causes a text messaging service of the target portable device to be temporarily disabled, in response to the processor determining that the target portable device is located within the predefined zone while the travel speed exceeds the predetermined threshold speed.

7. The method according to claim 1, the method further comprising:
    setting, with the processor, an operating mode of a cruise control system of the vehicle in response to the target portable device being located within the predefined zone and in accordance with a predetermined operating mode for the cruise control system associated with the identifier of the target portable device.

8. The method according to claim 1, the method further comprising:
    changing, with the processor, settings of an infotainment system of the vehicle in response to the target portable device being located within the predefined zone and in accordance with predetermined settings for the infotainment system associated with the identifier of the target portable device.

9. The method according to claim 1, the method further comprising:
    determining, with the processor, a location of a further target portable device with respect to the vehicle by operating the radio transceivers of the plurality of system nodes to perform the ranging process with the further target portable device;
    determining, with the processor, whether the further target portable device is located within a further predefined zone within the vehicle based on the determined location of the further target portable device;
    receiving, with the processor, a message from the further target portable device including a further identifier of the further target portable device, the further identifier being a value that identifies the further target portable device;
    changing, with the processor, settings of a passenger entertainment system of the vehicle in response to the further target portable device being located within the further predefined zone and in accordance with predetermined settings for the passenger entertainment system associated with the further identifier of the further target portable device.

10. The method according to claim 1, the method further comprising:
operating, with the processor, a temperature control system of the vehicle to set a temperature of the vehicle in response to the target portable device being located within the predefined zone and in accordance with a predetermined target temperature for the vehicle associated with the identifier of the target portable device.

11. The method according to claim 1, the method further comprising:
operating, with the processor, a temperature control system of the driver seat to set a temperature of the driver seat in response to the target portable device being located within the predefined zone and in accordance with a predetermined target temperature for the driver seat associated with the identifier of the target portable device.

12. The method according to claim 1, the method further comprising:
operating, with the processor, an actuator of the driver seat to set a position of the driver seat in response to the target portable device being located within the predefined zone and in accordance with a predetermined position for the driver seat associated with the identifier of the target portable device.

13. The method according to claim 1, the method further comprising:
operating, with the processor, a lighting system of the vehicle to set a lighting level of the vehicle in response to the target portable device being located within the predefined zone and in accordance with a predetermined lighting level for the vehicle associated with the identifier of the target portable device.

14. The method according to claim 1, further comprising:
determining, with the processor, respective locations of a plurality of target portable devices with respect to the vehicle by operating the radio transceivers of the plurality of system nodes to perform a ranging process with each of the plurality of target portable devices; and operating, with the processor, an actuator of a foldable passenger seat of the vehicle to one of (i) fold and (ii) unfold the foldable passenger seat based on a number of target portable devices in the plurality of target portable devices.

15. The method according to claim 1, wherein the radio transceiver of each system node of the plurality of system nodes comprises an ultra-wideband transceiver.

16. The method according to claim 1, wherein:
a first system node in the plurality of system nodes is a master system node and is configured to operate each other system node in the plurality of system nodes; and
the processor of vehicle access system is a processor of the master system node.

17. The method according to claim 1, wherein the plurality of system nodes are operably connected to one another by a wired communication bus.

18. A vehicle access system of a vehicle, the vehicle access system comprising:
a plurality of system nodes installed throughout a vehicle, each system node in the plurality of system nodes including a radio transceiver configured to wirelessly communicate with a target portable device; and
a processor operably connected to the plurality of system nodes, the processor configured to:
determine respective locations of a plurality of target portable devices with respect to the vehicle by operating the radio transceivers of the plurality of system nodes to perform a ranging process with each of the plurality of target portable devices;
determine a number of target portable devices located within a predefined range the vehicle based on the determined locations of the plurality of target portable devices; and
operate an actuator of a foldable passenger seat of the vehicle to one of (i) fold and (ii) unfold the foldable passenger seat based on a number of target portable devices in the plurality of target portable devices that are located within the predefined range of the vehicle.

* * * * *